United States Patent
Buzawa

Patent Number: 5,088,803
Date of Patent: Feb. 18, 1992

[54] TECHNIQUE FOR COUPLING LASER DIODE TO OPTICAL FIBER

[75] Inventor: David M. Buzawa, San Jose, Calif.

[73] Assignee: Iris Medical Instruments, Inc., Mountain View, Calif.

[21] Appl. No.: 498,861

[22] Filed: Mar. 23, 1990

[51] Int. Cl.⁵ .............................. G02B 6/32
[52] U.S. Cl. ............................ 385/33; 385/15
[58] Field of Search ............ 350/96.18, 96.15, 96.16

[56] References Cited

U.S. PATENT DOCUMENTS

| | | | |
|---|---|---|---|
| 4,749,250 | 6/1988 | Carter | 350/96.18 X |
| 4,761,050 | 8/1988 | Byron | 350/96.18 X |
| 4,787,013 | 11/1988 | Sugino et al. | 350/96.18 X |
| 4,807,954 | 2/1989 | Oyanada et al. | 350/96.15 |
| 4,844,575 | 7/1989 | Chande | 350/96.18 |

Primary Examiner—John D. Lee
Assistant Examiner—Phan T. Heartney
Attorney, Agent, or Firm—Townsend and Townsend

[57] ABSTRACT

A technique for coupling the output of a laser diode (30) to an optical fiber (32) entails disposing an optical train (37,38) between the source and the fiber, and locating the fiber end at or near the exit pupil of the optical train. In one embodiment of the invention, light from the laser diode source is imaged by a first lens (37) of focal length $f_1$, forming a magnified real image of the source at a convenient distance, the real image is reimaged by a second lens (37) of focal length $f_2$, and the fiber end is located at the exit pupil. The real image may be reimaged approximately at infinity.

15 Claims, 2 Drawing Sheets

TECHNIQUE FOR COUPLING LASER DIODE TO OPTICAL FIBER

BACKGROUND OF THE INVENTION

The present invention relates generally to laser diodes and fiber optics and more particularly to a technique for efficiently coupling the output of a laser diode to an optical fiber.

Laser diodes have emerged as important new sources of optical energy. Their small size and high electrical to optical conversion efficiencies make them attractive alternatives to more conventional lasers such as ion and solid state lasers in many commercial applications, including medicine and industry. One example of a medical application is directing the laser's infrared radiation (referred to as the light beam or simply the light) into one end of an optical fiber inserted into an eye, and causing the light emerging from the other end of the fiber to illuminate a small area on the retina.

Laser diodes are not without their drawbacks, however, a most notable one being the difficulty of coupling their output into an optical fiber. The laser output is highly asymmetric, with an elliptical beam profile. Additionally, the numerical aperture (n.a.), defined as the sine of the half angle of the diverging fan of light multiplied by the index of the medium in which the angle is being measured (typically air with an index n of 1.000), differs by a factor of 3 to 5 between the major and minor axes of the beam. These profiles are created at least in part by a semiconductor laser gain medium whose width to height ratio may be between 4 and 10,000, depending on specific diode type, and an active region that allows waveguided modes to propagate in one axis and free space modes in the orthogonal axis. Additionally, the laser diode is an astigmatic source. That is, the fans of rays in the planes of the major and minor axes do not diverge from the same point.

Resultant laser beams from such devices with power outputs in the 100 to 5000 milliwatt range often are nearly diffraction limited in one axis (the short aperture dimension, perpendicular to the diode junction) and many times diffraction limited in the orthogonal axis (the long aperture dimension, parallel to the diode junction). With these beam characteristics, it is not hard to appreciate the difficulties encountered when trying to efficiently deliver these beams to circular fiber optics.

One coupling technique is to permanently fasten the emitting facet of the laser to the face of a fiber having a core diameter equal to or greater than the larger dimension of the emitting aperture. This intrinsically produces an output beam of reduced optical brightness, as the waveguiding quality of the fiber yields a radially symmetric output beam with n.a. equal to the largest input n.a. and beam diameter equal to the fiber diameter (itself already equal to or greater than the largest linear dimension of the laser diode aperture). Attempts to reduce output beam dimensions by using undersize optical fibers or to minimize output n.a. by using fibers manufactured with low n.a. characteristics themselves invariably result in a decrease in coupling efficiency. Moreover, the permanence of the connection leaves no convenient way to disconnect or exchange fibers, i.e. for cleaning, repair, or sterilization.

A second technique is to image the emitting aperture on the entrance face of the fiber. A first, typically high n.a., lens efficiently collects and collimates the laser output. A second lens focuses the beam onto the face of the fiber core. As this technique employs an image of the emitting aperture and not the aperture itself, it is somewhat easier to incorporate removable fiber optics. Transmission through the fiber again results in a radially symmetric beam with output n.a. not less than the largest input n.a. and output diameter not less than the largest linear dimension of the input beam image. As described previously, attempts to implement fibers with smaller diameters or lower n.a. can only result in poorer coupling efficiencies: the intrinsic brightness of an optical source cannot be increased by reimaging, or indeed by any optical technique.

SUMMARY OF THE INVENTION

The present invention provides a technique for coupling the output of a laser diode to an optical fiber while preserving more of the fundamental brightness of the source and offering significantly reduced output numerical aperture, even where the fiber core diameter is approximately the same dimension as the emitting aperture length. Moreover, the invention is relatively insensitive to astigmatism in the source, a problem common to most laser diode sources.

The invention entails disposing an optical train between the source and the fiber, and locating the fiber end at or near the exit pupil of the optical train in such a way that beam asymmetry is minimized. The exit pupil is defined as the image of the entrance pupil.

In one embodiment of the invention, light from the laser diode source is imaged by a first lens (focal length $f_1$), forming a magnified real image of the source at a convenient distance, the real image is reimaged by a second lens (focal length $f_2$), and the fiber end is located at the exit pupil. The real image may be reimaged approximately at infinity in order to minimize the n.a. input to the fiber. However, departure from this condition may be useful to accommodate a wide range of fiber diameters.

The real image of the source formed by the primary lens is increased by a magnification factor M. Beam n.a. at this point is reduced by this same factor. This real image is now reimaged by the second lens. Magnification M and focal length $f_2$ are chosen in such a way so as to yield an exit pupil with dimensions generally commensurate with the fiber diameter. The entrance face of the fiber is located at or near the exit pupil of the optical train in such a position that the beam asymmetry is minimized. This sequence provides increased throughput to a circular fiber as compared to a direct image of the source.

A further understanding of the nature and advantages of the present invention may be realized by reference to the remaining portions of the specification and the attached drawings.

DESCRIPTION OF SPECIFIC EMBODIMENTS

Figure 1A:
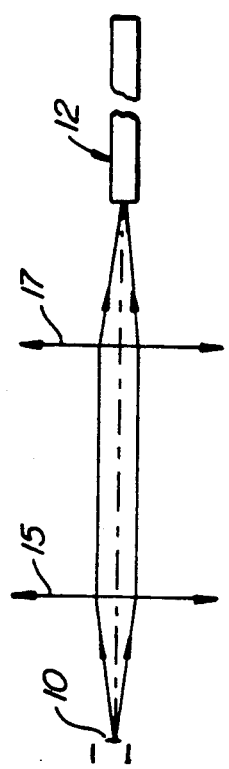
FIGS. 1A and 1B are side and top view optical schematics of a prior art configuration for coupling the output of a diode laser to an optical fiber.
Figure 1B:
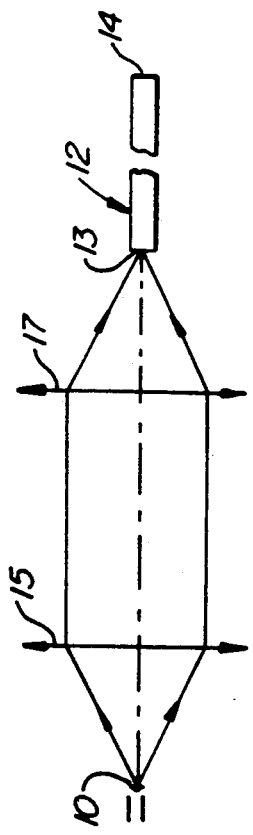

FIGS. 1A and 1B are side and top view optical schematics of a prior art technique for coupling the output of a laser diode 10 to an optical fiber 12 having an input face 13 and an output face 14. The laser and fiber dimensions are greatly exaggerated. A typical high-power laser diode of interest has an output power on the order of 1 watt, an output wavelength in the vicinity of 800–850 mm, and an emitting portion that is approximately 1 micron high and perhaps 100 microns wide.

The laser diode emits an elliptical beam, which has a greater angular spread in the vertical plane, and is thus characterized by numerical apertures (n.a.'s) in the horizontal and vertical plane, designated (n.a.)$_x$ and (n.a.)$_y$ with typical values of 0.1 and 0.5, respectively. The n.a. is defined as the sine of the half angle that characterizes the diverging beam. A perfect cone would have equal values of n.a. in both planes.

Fiber 12 comprises a core, a surrounding annular cladding, and typically a protective sheath. A typical core diameter for present purposes is about 200 microns. The cladding surrounding the core is generally made of the same material (glass or fused quartz) but characterized by a lower index of a refraction.

The beam output from laser diode 10 is collected and collimated by a first lens 15, and refocused by a second lens 17 on input face 13 of the fiber core. If the lenses have the same focal length, the n.a. of the beam input to the fiber is the same as the output n.a. of the laser. It is possible to reduce the n.a. input to the fiber, but at the expense of a larger image size. (A quantity known as the Lagrange Invariant, defined as the product of the object or image height times the n.a. at that point, remains constant through the system.)

The light emerging from the fiber at output face 14 is a radially symmetric beam with an output n.a. at least as large as the largest input n.a. and a diameter at least as large as the largest linear dimension of the input beam image. Thus, for the case where the lenses are of equal focal length, so that the n.a. and image size are preserved, the output n.a. from the fiber equals the lesser of the fiber n.a. and (n.a.)$_y$. Since a typical fiber n.a. is about 0.20–0.35, the output beam has an n.a. of that magnitude.

Typically, it is desirable to have a small output beam spot, both to provide sufficient laser intensity in the treatment zone and to avoid subjecting the adjacent areas to unneeded laser radiation. Since the area of the beam spot for a given working distance is proportional to the square of the output n.a., for this large an output n.a., a small beam spot can only be obtained at what is typically an undesirably small working distance.

Figure 2A:
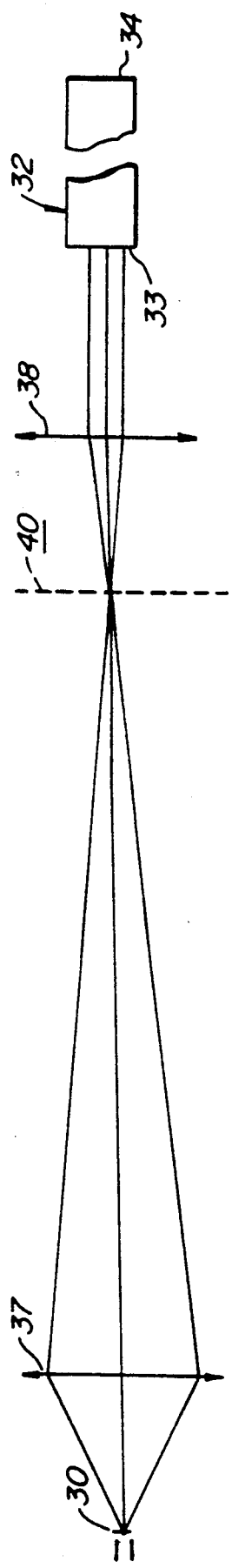
FIGS. 2A and 2B are side and top view optical schematics showing the present invention.
Figure 2B:
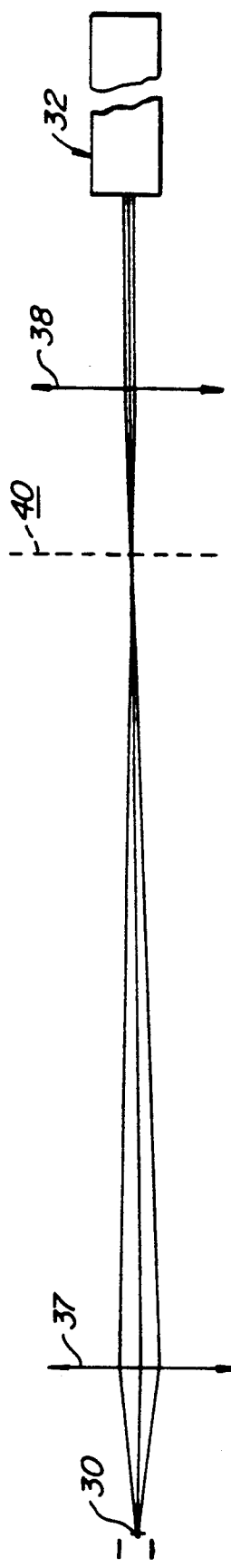

FIGS. 2A and 2B are side and top view optical schematics of the technique according to the present invention for coupling the output from a laser diode 30 to an optical fiber 32 having an input face 33 and an output face 34. The present invention utilizes a pair of lenses 37 and 38, but in a manner differently from that shown in FIGS. 1A-B. Specifically, lens 37 collects the output beam from laser diode 30, and provides a magnified real image of the laser aperture in an image plane 40. The real image is characterized by a magnification factor of M, and the beam n.a.'s at this point are reduced by this same factor of M. Lens 38 has its front focal plane located near image plane 40 so as to reimage the real image approximately at infinity and direct the nearly collimated light into the fiber. Although the optical schematics show thin lenses, it should be appreciated that lenses 37 and 38 are typically multi-element lens assemblies.

A significant aspect of the invention is the placement of input face 33 relative to lens 38. This placement is such that the exit pupil is located at or near the input face. Put another way, assuming that lens 37, or a part of its mounting near its actual position defines the aperture stop and thus the entrance pupil, the exit pupil is located where the entrance pupil is imaged by lens 38.

Moreover, the characteristics of the light entering the fiber can be modified by the previously mentioned optical train to yield an input n.a. that is only a fraction of the original laser diode source (say 10–20%), while simultaneously maintaining an input spot size compatible with a wide range of useful fiber sizes.

Figure 3:
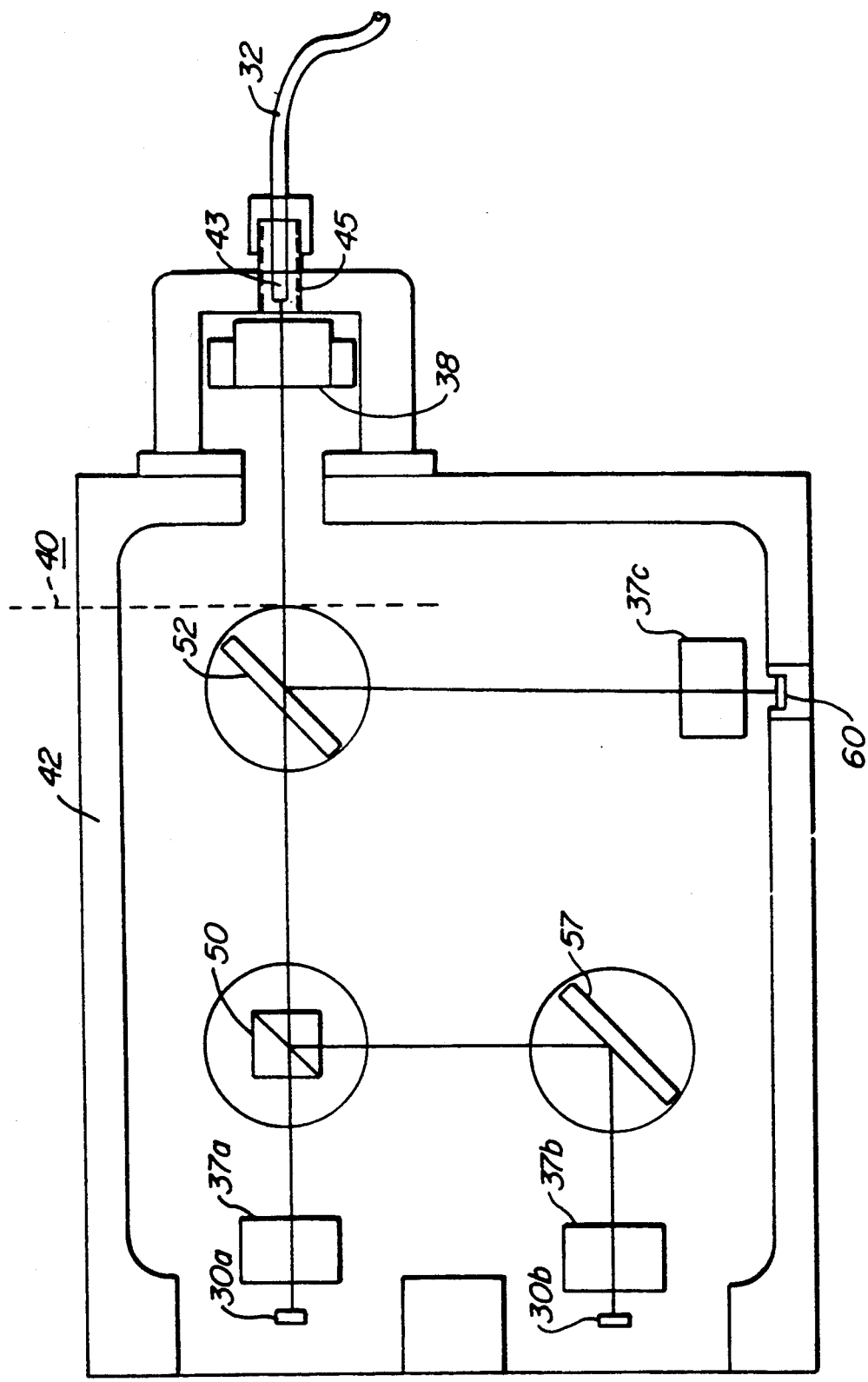
FIG. 3 is a top plan optical layout of a specific embodiment.

FIG. 3 is an optical layout of a representative embodiment of the present invention. Elements corresponding to those in FIG. 2 use the same reference numerals, in some cases with a letter suffix. The elements (other than the fiber) are enclosed in a cabinet 42. The detachable fiber is terminated at its input end with an SMA-type male connector 43, and mates with a corresponding female connector 45 mounted to the front face of the cabinet. The position of the female connector is adjustable in small precise increments in order to locate the fiber end correctly relative to the optical train within the cabinet. In the particular embodiment, the lenses have focal lengths of 8.2 mm and clear apertures of 8.5 mm.

The embodiment uses first and second high power laser diodes 30a and 30b to provide more power. The laser diodes are disposed so that they emit in generally the same direction but have their emitting apertures perpendicular to each other. This produces two beams, with mutually perpendicular planes of polarization. Associated with laser diodes 30a and 30b are respective lenses 37a and 37b. The light from laser diode 30a passes through lens 37a, a beam combiner 50, a dichroic reflector 52, and lens 38 prior to entering fiber 32. The light from laser diode 30b is reflected from a 90° reflector 57 and beam combiner 50, and passes through dichroic reflector 52 and lens 38. Beam combiner 50 has the property that it is transmissive to the horizontally polarized output of laser diode 30a and reflective to the vertically polarized output of laser diode 30b.

It should be noted that lenses 37a and 37b (and thus the entrance pupils) are at different distances from lens 38, whereupon the exit pupils are at different locations. However, the difference in location is small.

Light from a third laser diode 60 passes through associated lens 37c, is reflected from dichroic reflector 52, and passes through lens 38. Laser diode 60 is a lower-power device (a few milliwatts) having an output in the visible wavelength range (670 nanometers), and dichroic splitter 52 operates to pass the infrared light from laser diode 30a and 30b and to reflect the visible light from laser diode 60. In use, laser diode 60 is energized for aiming and positioning, after which the high power laser diodes can be energized for desired lengths of time.

This embodiment of the invention illustrates an aspect of the invention wherein the reimaging of the real image in image plane 40 is not at infinity. While this results in a final input n.a. to the fiber that is somewhat larger than would otherwise be the case, it provides improved coupling efficiency for small diameter fibers.

In conclusion it can be seen that the present invention provides a technique for efficiently coupling the laser diode light into an optical fiber in a manner that provides a significantly reduced output n.a. While the above is a complete description of the preferred embodiments of the invention, various alternatives, modifications, and equivalents may be used. For example, light emitting diodes could be used as visible sources. Although they are not nearly as directional as the laser diodes, they are orders of magnitude less expensive. Therefore, the above description should not be taken as limiting the scope of the invention which is defined by the appended claims.

What is claimed is:

1. Apparatus for coupling a source of angularly diverging light to an optical fiber comprising:
    an optical train disposed between the source of angularly diverging light and the fiber, said optical train being characterized by an entrance pupil; and
    means associated with said optical train for imaging said entrance pupil on an input end of the fiber.

2. Apparatus for coupling a source of angularly diverging light to an optical fiber comprising:
    first imaging means for producing a first image of the source of angularly diverging light;
    second imaging means for producing a second image of said first image; and
    means for registering an input end of the fiber at an exit pupil location defined by said first and second imaging means.

3. The apparatus of claim 2 wherein said first image is a magnified real image.

4. The apparatus of claim 2 wherein:
    said fiber is characterized by a fiber numerical aperture;
    light from said first image is characterized by an image numerical aperture that is less than said fiber numerical aperture; and
    said second imaging means causes light from said first image to enter said fiber with an effective numerical aperture approximating said image numerical aperture.

5. Apparatus for coupling a laser diode to an optical fiber comprising:
    a first positive lens disposed so as to produce a magnified real image of the laser diode in an image plane;
    a second positive lens; and
    a fiber holder disposed so that an input end of the fiber is located substantially at the exit pupil of the optical system defined by said first and second lenses.

6. The apparatus of claim 5 wherein said second positive lens has a front focal plane located substantially at said image plane.

7. The apparatus of claim 5 wherein said second positive lens has a front focal plane located substantially at said image plane.

8. Apparatus for use in combination with an optical fiber comprising:
    a source of angularly diverging light;
    an optical train disposed between said source and the fiber, said optical train being characterized by an entrance pupil; and
    means associated with said optical train for imaging said entrance pupil on an input end of the fiber.

9. The apparatus of claim 8 wherein said source is a laser diode.

10. Apparatus for use in combination with an optical fiber comprising:
    a source of angularly diverging light;
    first imaging means for producing a first image of said source;
    second imaging means for producing a second image of said first image; and
    means for registering an input end of the fiber at an exit pupil location defined by said first and second imaging means.

11. The apparatus of claim 10 wherein said source is a laser diode.

12. The apparatus of claim 10 wherein said first image is a magnified real image.

13. The apparatus of claim 10 wherein:
    said fiber is characterized by a fiber numerical aperture;
    light from said first image is characterized by an image numerical aperture that is less than said fiber numerical aperture; and
    said second imaging means causes light from said first image to enter said fiber with an effective numerical aperture approximating said image numerical aperture.

14. Apparatus for use in combination with an optical fiber comprising:
    a laser diode;
    a first positive lens disposed so as to produce a magnified real image of said laser diode in an image plane;
    a second positive lens; and
    a fiber holder disposed so that an input end of the fiber is located substantially at the exit pupil of the optical system defined by said first and second lenses.

15. A method of coupling a laser diode source to an optical fiber comprising the steps of:
    forming a first image that is a magnified real image of the laser diode source at an image location;
    forming a second image that is an image of the magnified real image;
    said steps of forming said first and second images being characterized by an entrance pupil location and an exit pupil location; and
    locating an input end of the optical fiber at the exit pupil location.

* * * * *